United States Patent [19]

Stroman

[11] 3,713,337
[45] Jan. 30, 1973

[54] APPARATUS AND METHOD FOR AUTOMATIC DIFFERENTIAL PRESSURE TRANSDUCER RANGE CHANGING

[75] Inventor: Larry J. Stroman, Houston, Tex.

[73] Assignee: Daniel Industries, Inc., Houston, Tex.

[22] Filed: Feb. 4, 1971

[21] Appl. No.: 112,670

[52] U.S. Cl..............73/205 R, 73/407 R, 73/398 R
[51] Int. Cl...............................................Golf 7/00
[58] Field of Search..........73/407, 205, 397, 35, 398; 324/115; 323/66

[56] References Cited

UNITED STATES PATENTS

| | | | |
|---|---|---|---|
| 3,514,209 | 5/1970 | McGhee et al. | 324/115 X |
| 3,555,901 | 1/1971 | Delatorre et al. | 73/205 R X |
| 3,350,945 | 11/1967 | Bristol | 73/407 R |

Primary Examiner—Charles A. Ruehl
Attorney—Arnold, White & Durkee and Darryl M. Springs

[57] ABSTRACT

In one exemplar embodiment, apparatus for automatic differential pressure transducer range changing is disclosed, utilizing a single differential pressure transducer the differential pressure measurement range of which may be changed merely by changing the characteristics of the electrical circuit generating a signal representative of the measured differential pressure and a signal level detector circuit to receive the output signal from the transducer and generate a signal the polarity of which changes in response to a change in level of the transducer output signal beyond a predetermined limit representative of a change in measurement range of the transducer. The Polarity-changing output signal of the detector circuit actuates a switching circuit to switch appropriate predetermined resistive elements into the transducer amplifier gain circuit to incrementally change the amplifier gain, and hence, the measurement range of the transducer.

7 Claims, 3 Drawing Figures

PATENTED JAN 30 1973 3,713,337

Larry J. Stroman
INVENTOR

BY
Arnold, White & Durkee
ATTORNEYS

APPARATUS AND METHOD FOR AUTOMATIC DIFFERENTIAL PRESSURE TRANSDUCER RANGE CHANGING

BACKGROUND OF THE INVENTION

A common problem in orifice measurement of flowing fluids is the rangeability of the differential pressure measuring apparatus. This problem results largely from the fact that the orifice flow measurement is calculated by extracting the square root of the prime variable, differential pressure. If a measurement range of 10:1 is utilized in the differential pressure transducer measuring the differential pressure across the orifice, resulting flow measurement range is only slightly greater than 3:1. Often the required flow measurement range exceeds this value and it becomes necessary to provide other means for handling an extended range of differential pressure measurement.

Extended ranging of differential pressure measurement is commonly done by either of two methods. The first method is to add additional meter runs in parallel, however, this is exceedingly expensive, since it duplicates all of the equipment in each parallel meter run. The second method is to add an additional transducer or transducers, the range of each of which is sized such that it extends the overall measurement range. A common measurement system for extending the flow range is to utilize two transducers, for example, 0 to 20 and 0 to 200 inches $H_2O$. With this arrangement, the 20-inch transducer is used when it is in range and the 200-inch transducer is used when the 20-inch transducer is out of its range. Differential pressure can then be measured from 2 to 200 inches and never go beyond a 10:1 range on a given transducer. Differential pressure measured from 2 to 200 inches $H_2O$ is a differential pressure variation of 100:1 and yields a flow measurement variation of 10:1. This is an acceptable extension over the 3:1 example hereinabove mentioned. This technique is in common use. However, it has a basic limitation in that two differential pressure transducers must be provided which adds to the expense and complication of the system.

The present invention remedies the problems of the prior art by providing method and apparatus for utilizing a single differential pressure transducer whose differential pressure measurement range may be changed merely by changing the characteristics of the electrical circuit generating a signal representative of the differential pressure measured by the device. One such transducer is the Series 400 transducers manufactured by KDG Instruments, Ltd. of Great Britain. The disclosed apparatus and method allow for utilization of a single transducer and automatic changing of the differential pressure measurement range as required to achieve the same performance as may be obtained by utilizing two separate transducers.

SUMMARY OF THE INVENTION

The present invention provides novel apparatus and method for automatically measuring a plurality of ranges of differential pressure of a fluid flowing across a pressure head producing device, i.e., an orifice plate, within a pipeline and utilizes a transducer means for measuring differential pressure across the orifice plate and an amplifying means cooperating with the transducer means to generate a first electrical signal representative of the measured differential pressure within a first measurement range. A signal level detector means receives the first electrical signal, detects the level of the electrical signal and generates a second electrical signal, the polarity of which changes in response to a change in level of the first electrical signal exceeding a predetermined signal level limit representative of a change in measurement range of the transducer means. A variable gain means cooperates with the amplifier means for automatically changing the gain of the amplifier means for accomplishing a change in measurement range of the transducer means. The variable gain means is actuated by a switching means responsive to the second electrical signal generated by the signal level detector.

Accordingly, one primary feature of the present invention is to provide an automatic differential pressure range changing circuit that utilizes only a single differential pressure transducer the differential pressure measurement range of which may be changed merely by changing the characteristics of the electrical circuitry that generates an electrical signal representative of the measured differential pressure, thereby effecting a substantial cost saving.

Another feature of the present invention is to provide a means of automatically changing the differential pressure measurement range of an electrical differential pressure transducer means and thereby expand rangeability of the orifice measuring system.

BRIEF DESCRIPTION OF THE DRAWINGS

In order that the manner in which the above-recited advantages and features of the invention are attained, as well as others which will become apparent, can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope for the invention may admit to further equally effective embodiments.

In the drawings.

DETAILED DESCRIPTION OF THE PREFERRED EMBODIMENTS

Figure 1:
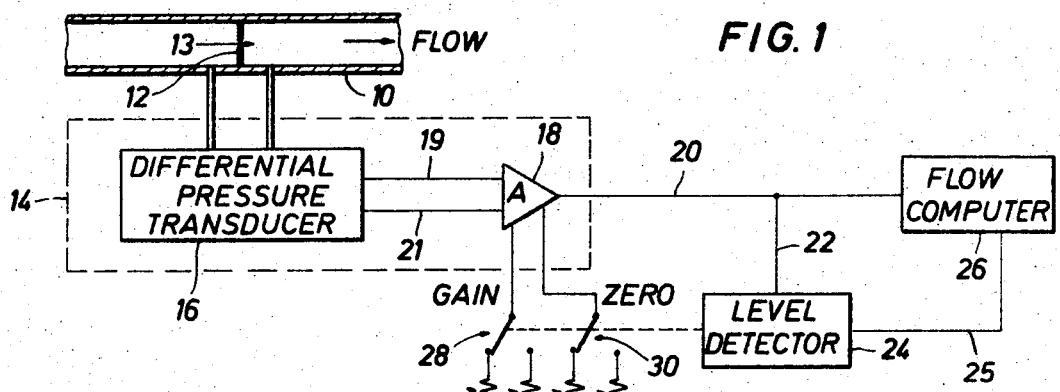
FIG. 1 is a schematic block diagram of the automatic differential pressure range changing circuit herein disclosed.

Referring now to FIG. 1, a pipe 10 is shown in cross-section having a fluid such as gas flowing therein in the direction shown by the arrow. For fluid flow measurement purposes, an orifice plate 12 is shown inserted in pipe 10, the orifice plate 12 having an orifice or aperture 13 for allowing the passage of the fluid but creating a pressure head across the orifice plate 12 for producing a differential pressure between the upstream and downstream sides of the plate. The differential pressure measurement is commonly utilized in calculating the flow rate and volume of the fluid moving through the pipeline 10. An electrical differential pressure transducer means 14, the differential pressure measuring range of which may be changed by merely changing the characteristics of the electrical circuit that generates an output signal representative of the measured differential pressure, is utilized to measure the differential pressure across orifice plate 12.

Electrical differential pressure transducer means 14 includes a differential pressure transducer means 16 which measures the differential pressure across the pressure producing head or orifice plate 12 and produces electrical signals representative of the upstream and downstream pressures across the orifice plate which are applied via conductors 19 and 21 to an amplifier means 18. The amplifier means 18 is typically a differential amplifier which subtracts the signals representative of the upstream and downstream pressures across the orifice plate 12 and generates an electrical signal representative of the differential pressure across the orifice plate. As hereinabove mentioned, the Series 400 transducer manufactured by KDG Industries, Ltd. may be advantageously utilized for transducer means 14.

This differential pressure signal is applied via conductor 20 to a flow computer 26 for utilization in calculating the flow rate and volume of the fluid moving through pipe 10. The electrical signal representative of the differential pressure is also applied via conductors 20 and 22 to a level detector and switching circuit 24 where the signal level of the electrical signal representative of the differential pressure is monitored. A level detector means or circuit senses a change in level of the electrical signal representative of differential pressure exceeding a predetermined signal level limit, representing a change in the measurement range of the differential pressure transducer means. The detector means actuates switching means within the level detector and switching circuit 24 to actuate a variable gain means interconnected in the gain control circuit of amplifier means 18 to change the gain of the amplifier by a predetermined value and accomplish a change in the differential pressure transducer measuring range. A signal representing the output signal of the detector circuit is also applied via conductor 25 to the flow computer 26 for reasons to be hereinafter further explained.

The variable gain means may be accomplished as shown in FIG. 1 by utilizing variable resistors 32 and 33, one side of each of which is connected to a common source potential in the gain circuitry of amplifier means 18, and the other side of each of which is connected to relay contacts 28 so that either resistor 32 or 33 may be inserted into the gain control circuit of amplifier means 18 for varying the gain of the amplifier by a predetermined value. Similarly, when the differential pressure measurement range of the electrical differential pressure transducer means 14 is changed, its zero point will also change and, accordingly, a zeroing means to adjust the zero point when the gain of amplifier means is changed may be included by utilizing relay contact 30, ganged to relay contact 28. Variable resistors 34 and 35 are connected to a common source potential in the zeroing circuitry of amplifier means 18, and may each be preset to accomplish the appropriate zeroing function when relay contact 30 is appropriately actuated by the level detector and switching circuit 24.

Commonly, a measurement system utilizing an extended flow range would be likely to utilize two measurement ranges, for example, 0 to 20 and 20 to 200 inches $H_2O$ differential pressure. Utilizing these two ranges, differential pressure can be measured from 2 to 200 inches $H_2O$ differential pressure, thereby providing a desirable differential pressure variation of 100:1. Accordingly, two differential pressure measuring ranges would be needed and two predetermined amplifier gain and zeroing values would be utilized in the gain and zeroing circuits associated with amplifier means 18 above described in order to electrically accomplish the change in differential pressure measurement range of the differential pressure transducer means 14.

Figure 2:
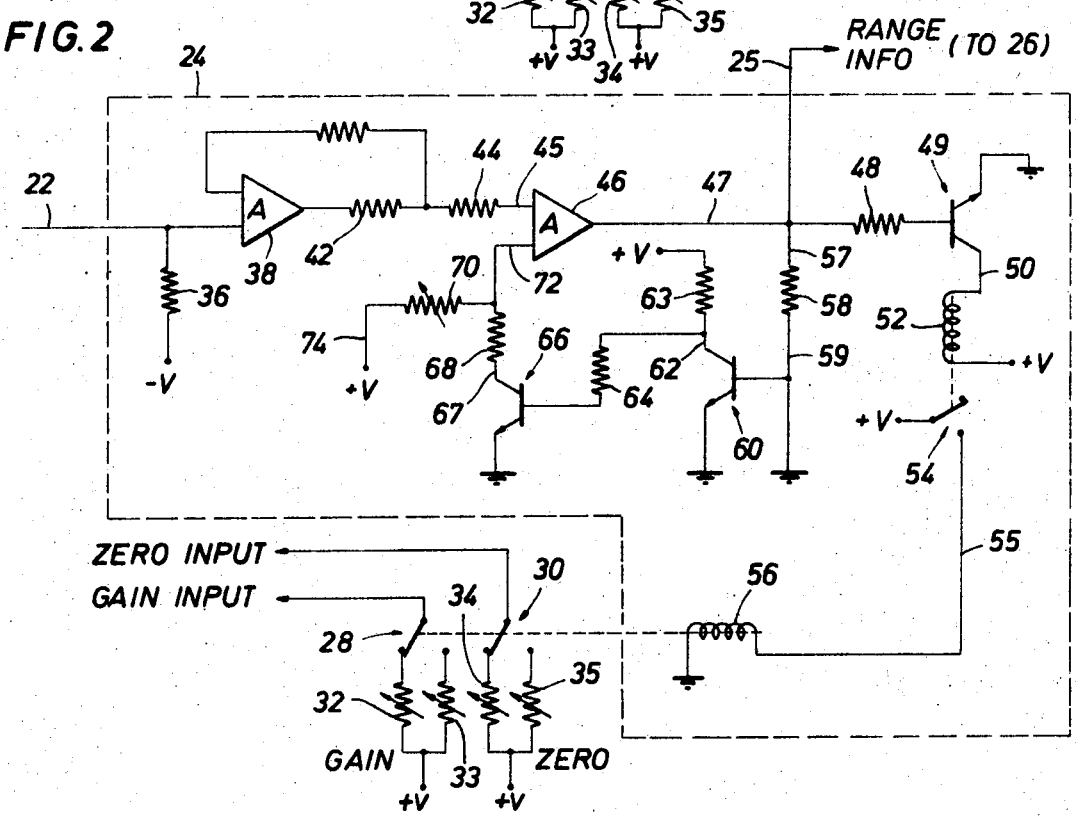
FIG. 2 is a schematic diagram of the level detector circuit, the switching circuit and the variable gain circuit utilized in the automatic differential pressure range changing circuit herein disclosed.

In FIG. 2, the level detector and switching circuit 24 is shown in greater detail. The electrical signal representative of differential pressure is applied via conductor 22 as an input to a buffer amplifier 38 that provides a high input impedance and avoids loading resistor 36. The output of buffer amplifier 38 is applied via resistors 42 and 44 and conductor 45 as one input to differential amplifier 46. Differential amplifier 46 functions as a level detecting circuit. A predetermined positive voltage is applied via conductors 74 and 72 and variable resistor 70 as a second input to level detector circuit 46. The output signal of level detector circuit 46 is applied via conductor 47 and resistor 48 to the base lead of NPN transistor 49 connected in a common emitter configuration. The collector lead 50 of transistor 49 is connected to a relay coil 52 which in turn actuates relay contacts 54. When relay contacts 54 are closed, positive voltage is applied via contact 54 and conductor 55 to relay coil 56. Energization of relay coil 56 actuates relay contacts 28 and 30 and switches either gain resistors 32 or 33 and zeroing resistors 34 and 35 into the circuit for varying the gain and zeroing functions of amplifier means 18 as hereinabove described.

The output of level detector circuit 46 is also applied via conductors 47, 57 and 59 and resistor 58 to the base lead of transistor 60, an NPN transistor connected in a common emitter configuration. The collector lead 62 of transistor 60 is connected to a source of positive potential via resistor 63 and is also connected via resistor 64 to the base lead of transistor 66, also an NPN transistor connected in a common emitter configuration. The collector lead 67 of transistor 66 is connected to resistor 68 and a variable resistor 70 and to conductor 72, the second input to the detector circuit 46. In addition, the output of level detector circuit 46 is applied via conductors 47 and 25 to flow computer 26 for reasons to be hereinafter discussed.

Figure 3:
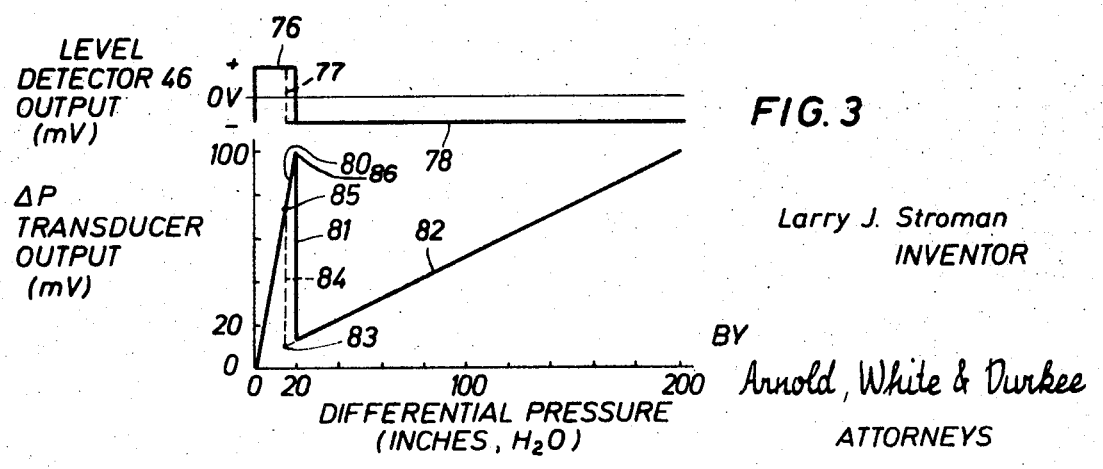
FIG. 3 is a graphical representation of the detector circuit output as it correlates to the output signal of the differential pressure transducer for a plurality of differential pressure ranges in accordance with the invention herein disclosed.

Referring now to FIGS. 1, 2 and 3, and assuming that the electrical differential pressure transducer means 14 utilizes two differential pressure measurement ranges, for example 0 to 20 and 20 to 200 inches $H_2O$, and assuming that the differential pressure measured is in the first or low measurement range, the first electrical signal generated by amplifier means 18, representing differential pressure, will be applied via conductors 20 and 22 as an input to buffer amplifier 38. The output of buffer amplifier 38 is applied via conductor 45 as an input to the level detector circuit 46. The differential pressure signal applied via conductor 45 is graphically illustrated in FIG. 3 at 80 in the low range, and 82 in the high range. A predetermined positive voltage is applied via conductors 74 and 72 and resistor 70 as a second input to the detector circuit 46. The predetermined voltage level applied in to detector 46 via conductor 72 sets the detector threshold level that separates the two measurement ranges of transducer means 14. In FIG. 3, the threshold voltage may be approximately 100 millivolts, for example. As long as the signal applied via conductor 45 to the input of level detector circuit 46 is less than the predetermined threshold potential via conductor 72, the output of detector circuit 46 will be a positive electrical signal. The detector output signal is graphically shown at 76 in FIG. 3. This positive electrical signal when applied via conductor 47 and resistor 48 to the base lead of transistor 49 causes the transistor to conduct and energize relay coil 52, thereby closing relay contact 54. When relay contact 54 is closed, voltage is applied from a positive voltage source via contact 54 and conductor 55 to energize relay coil 56, thereby actuating relay contacts 28 and 30 to switch gain resistor 33 and zeroing resistor 35 into the circuit for the amplifying means 18. The electrical differential transducer means 14 is now set in its low differential pressure measurement range. In the low range, the differential pressure signal applied in a conductor 45 to detector 46 is illustrated in FIG. 3 at 80.

With electrical differential pressure transducer 14 in its low range, i.e., the output of detector 46 is a positive electrical signal, the signal applied via conductors 47, 57 and 59 and resistor 58 to the base lead of transistor 60. With a positive potential applied to its base lead, transistor 60 will conduct, applying a negative bias to the base lead of transistor 66 via emitter lead 62 and resistor 64, assuring that transistor 66 is biased to cut-off and will have no effect on the voltage potential applied to detector circuit via conductor 72 as the detector threshold level.

When the signal applied via conductor 45 as an input to level detector circuit 46 exceeds the predetermined positive voltage potential applied via conductor 72, i.e., 100 millivolts, for example (FIG. 3), the output signal of detector circuit 46 changes polarity and becomes a negative signal shown graphically in FIG. 3 at 78. The negative signal output of detector 46 applied to the base lead of transistor 49 biases transistor 49 to cut-off and deenergizes relay coil 52, thereby opening relay contact 54. The opening of relay contact 54 deenergizes relay coil 56 and actuates relay contacts 28 and 30 to switch gain resistor 32 and zeroing resistor 34 into the gain and zeroing circuits for amplifying means 18. This switching action switches the gain of amplifying means 18 to its second or high differential pressure measuring range until such time as the electrical signal applied via conductor 45 as an input to detector circuit 46 drops below the value of the adjusted predetermined positive potential applied via conductor 72 as hereinafter described. The change in gain of amplifier means 18 shifts the output of transducer means 14 to the high range as shown in FIG. 3 at 81 and 82.

When the output signal from the level detector circuit 46 changes to a negative potential, as when the differential pressure measuring range moves from its low to its high measuring range, the negative signal applied via conductors 47, 57 and 59 and resistor 58 to the base lead of transistor 60 biases transistor 60 to cut-off and allows a positive potential to be applied via conductor 62 and resistors 63 and 64 to the base lead of transistor 66, causing transistor 66 to conduct. With transistor 66 conducting, the potential applied via conductor 72 as an input to the level detector circuit 46 will drop to a lower value, approximately 10 millivolts, for example, as shown at 83 in FIG. 3. Resistors 68 and 70 are so sized that the lower voltage applied via conductor 72 when transistor 66 is conducting will be the low-level switching point where the transducer means 14 will revert to low range from the high range.

As may be seen in FIG. 3, when the output of detector circuit 46 is positive, the differential pressure transducer means 14 output remains in its low range (i.e., 0–20 inches $H_2O$, for example) as represented by the graphical representation at 80, and when the detector circuit 46 output changes polarity to a negative potential as graphically shown at 78, the differential pressure transducer means 14 output shifts to a high range (i.e., 20–200 inches $H_2O$, for example) as represented graphically at 82.

Transistors 60 and 66 provide a hysterisis circuit for lowering the level detector 46 threshold level as applied in via conductor 72 to the level shown graphically at point 83 in FIG. 3, where the high level range reverts back to the low level measuring range. When the differential pressure signal applied via conductor 45 falls below the level shown at point 83 in FIG. 3, the output of detector 46 becomes positive, as shown at 77 in FIG. 3, thereby switching the gain as hereinbefore described and causing transistor 60 to conduct and biasing transistor 66 to cut-off. The threshold level applied via conductor 72 to detector 46 again rises to the level indicated at point 86 in FIG. 3 and changes in the differential pressure signal cause the detector circuit 46 to respond as hereinbefore described. In shifting from high range to low range, the differential pressure signal is graphically shown at 82, 84, 85 and then tracks the line at 80.

The output of detector 46 is also applied via conductors 47 and 25 to flow computer 26. The detector output signal is applied to flow computer 26 to supply conventional range information to the flow computer for changing scaling factors in the computer for calculation of flow rate and volume.

Numerous variations and modifications may be obviously made in the structure herein described without departing from the present invention. Accordingly, it should be clearly understood that the forms of the invention herein described and shown in the figures of the accompanying drawings are illustrative only and are not intended to limit the scope of the invention.

What is claimed is:

1. An apparatus for automatically measuring a plurality of ranges of differential pressure of a fluid flowing across a pressure head producing device within a pipeline, comprising
    a differential pressure transducer for measuring the differential pressure across the pressure head producing device, amplifier means cooperating with said transducer for generating a first electrical signal representative of said measured differential pressure within a first measurement range, signal level detector means for comparing the signal level of said first electrical signal against an electrical signal of predetermined level representative of one limit of said measurement range and generating a second electrical signal the level of which is indicative of whether the level of said first electrical signal is above or below said signal of predetermined level, circuit means responsive to said second electrical signal for generating a third electrical signal directly related to the level of said second electrical signal, relay means operable in response to said third electrical signal, variable gain means electrically interconnected with said amplifier means for changing the gain of said amplifier means between a gain appropriate to said first measurement range and a gain appropriate to a second measurement range in response to the operation of said relay means, and zeroing means electrically interconnected with said amplifier means for adjusting the electrical zero of said amplifier means when said amplifier means switches from said first measurement range to said second measurement range, said zeroing means operable in response to said relay means.

2. An apparatus as claimed in claim 1, wherein said signal level detector means comprises
  a buffer amplifier for receiving said first electrical signal representative of said measured differential pressure within a first measurement range, and
  a differential amplifier having a first signal input of a predetermined level and receiving said first electrical signal from said buffer amplifier as a second signal input, said differential amplifier generating as an output said second electrical signal the level of which is directly related to the algebraic difference between said first and second signal inputs.

3. An apparatus as claimed in claim 2, wherein said variable gain means comprises
  a plurality of variable resistors one side of each of which is commonly connected to a source of voltage, the other side of each of which is connected to one of a plurality of relay contacts, a relay switch cooperating with said contacts and being connected to a gain control circuit of said amplifier means, each of said variable resistors being set to a predetermined resistance for varying the gain of said amplifier means by a predetermined value when different ones of said variable resistors is connected with the amplifier means circuit.

4. An apparatus as claimed in claim 3, wherein said zeroing means comprises
  a plurality of variable resistors one side of each of which is commonly connected to a source of voltage, the other side of each of which is connected to one of a plurality of relay contacts, a relay switch cooperating with said contacts and being connected to a zeroing circuit of said amplifier means, each of said variable resistors being set to a predetermined resistance for changing the electrical zero of said amplifier means when different ones of said variable resistors is connected with the amplifier means circuit.

5. The apparatus as claimed in claim 4, wherein said relay means comprises
  a first relay operable in response to said third electrical signal, and
  a second relay responsive to the operation of said first relay for actuating said relay switches in said variable gain and zeroing means to connect different ones of said variable resistors of said variable gain and zeroing means into the amplifier means circuit.

6. A method for automatically measuring a plurality of ranges of differential pressure of a fluid flowing across a pressure head producing device within a pipeline, comprising
  measuring the differential pressure across the pressure head producing device,
  generating a first electrical signal representative of said measured differential pressure within a first measurement range,
  detecting changes in the signal level of said first electrical signal,
  generating a second electrical signal the level of which is indicative of whether the level of said first electrical signal is above or below a predetermined signal level representative of one limit of said measurement range,
  generating a third electrical signal representative of a change in level of said second electrical signal, and
  changing the gain and electrical zero of an amplifier generating said first electrical signal in response to said third electrical signal.

7. An apparatus for automatically measuring a plurality of ranges of differential pressure of a fluid flowing across a pressure head producing device within a pipeline, comprising
  a differential pressure transducer for measuring the differential pressure across the pressure head producing device,
  amplifier means cooperating with said transducer for generating a first electrical signal representative of said measured differential pressure within a first measurement range,
  a buffer amplifier for receiving said first electrical signal representative of said measured differential pressure within a first measurement range,
  a differential amplifier having a first signal input of a predetermined level and receiving said first electrical signal from said buffer amplifier as a second signal input, said differential amplifier generating as an output a second electrical signal the level of which is directly related to the algebraic difference between said first and second signal inputs,
  circuit means responsive to said second electrical signal for generating a third electrical signal directly related to the level of said second electrical signal,
  relay means operable in response to said third electrical signal,
  a plurality of variable resistors one side of each of which is commonly connected to a source of voltage, the other side of each of which is connected to one of a plurality of relay contacts, a relay switch cooperating with said contacts and being connected to a gain control circuit of said amplifier means, each of said variable resistors being set to a predetermined resistance for varying the gain of said amplifier means by a predetermined value when different ones of said variable resistors are connected with the amplifier means circuit, said relay switch operating in response to the operation of said relay means, and a plurality of variable resistors one side of each of which is commonly connected to a source of voltage, the other side of each of which is connected to one of a plurality of relay contacts, a relay switch cooperating with said contacts and being connected to a zeroing circuit of said amplifier means, each of said variable resistors being set to a predetermined resistance for changing the electrical zero of said amplifier means when different ones of said variable resistors are connected with the amplifier means circuit, said relay switch being operable in response to the operation of said relay means.

* * * * *